R. STRAUBEL.
BINOCULAR TELESCOPE WITH DOUBLE HINGE.
APPLICATION FILED JUNE 25, 1908.

911,776. Patented Feb. 9, 1909.

Witnesses:
Carl Krüger
Fritz Sander

Figure 2:

Inventor:
Rudolf Straubel ated according to the invention. Fig. 2
UNITED STATES PATENT OFFICE.

RUDOLF STRAUBEL, OF JENA, GERMANY, ASSIGNOR TO THE FIRM OF CARL ZEISS, OF JENA, GERMANY.

BINOCULAR TELESCOPE WITH DOUBLE HINGE.

No. 911,776.  Specification of Letters Patent.  Patented Feb. 9, 1909.

Application filed June 25, 1908. Serial No. 440,304.

*To all whom it may concern:*

Be it known that I, RUDOLF STRAUBEL, a citizen of the German Empire, and residing at Carl-Zeiss strasse, Jena, in the Grand Duchy of Saxe-Weimar, Germany, have invented a new and useful Binocular Telescope with Double Hinge, of which the following is a specification.

The invention relates to binocular telescopes, which are equipped with a double hinge connection for adapting the distance between the oculars to the inter-pupillary distance. Such instruments have already been proposed in the patent specification 546871. According to the present invention they are adapted in a very simple manner for use on a stand by developing the member common to the two hinges as the stand head. The single telescopes, which are symmetrically connected with the one hinge and with the other hinge respectively, may be coupled together, so that with each ocular distance they lie symmetrically to the stand head.

To the advantage in simplicity, which the ordinary hinged binocular telescopes have over the new telescope, in that they have only one hinge, a drawback is attached, namely, the somewhat complicated appliance required to arrange them on the stand so that the distance between the oculars can be conveniently altered without the symmetrical trim of the instrument upon the stand being lost. The new stand telescope with double hinge is thus enabled to enter into competition with the older binocular stand telescopes, in that no supplementary appliances to the stand are necessary, and a member of the instrument proper represents at the same time an indispensable part of the stand.

If the new telescope be given an enlarged distance between the objectives, the single telescopes can, without the instrument losing its adaptability as a binocular telescope, be rendered available for the monocular use of two observers simultaneously. To effect this it is only necessary to make each hinge axle pass approximately through the center of gravity of the respective telescope. The hinge is expediently formed, so that the main body of the single telescope lying transverse to the direction of view is provided with trunnions and the stand head fitted with open bearings. In that case the head of the stand and the two single telescopes can be individually packed for transport.

Figure 1:
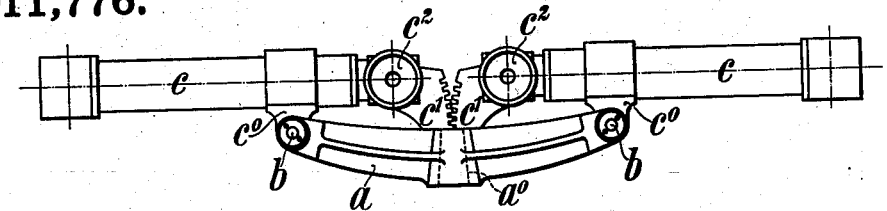
Figure 3:
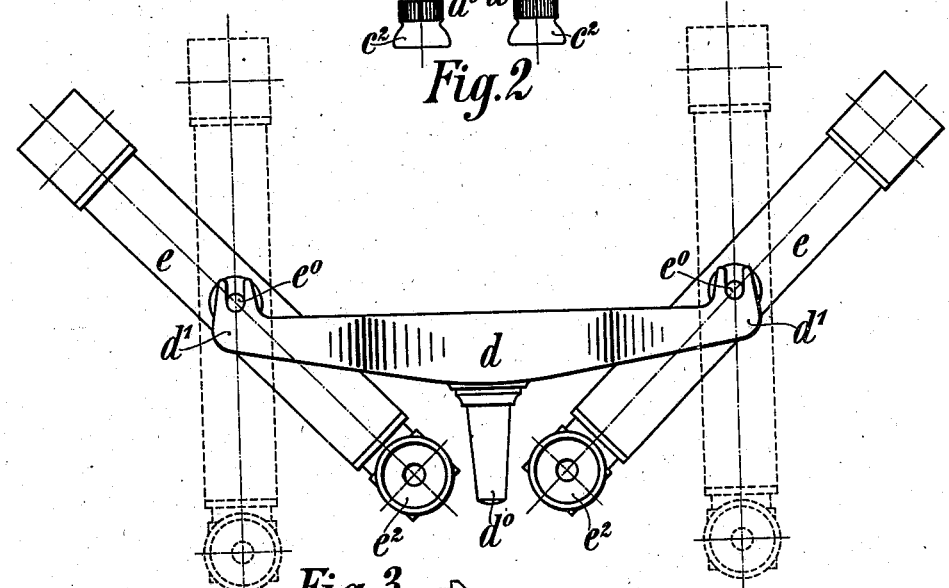
Figure 4:
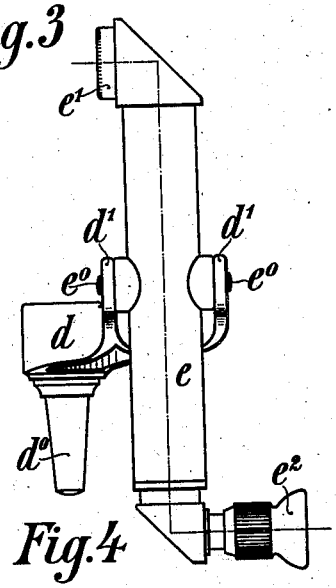

In the annexed drawing: Figure 1 is a front elevation of a binocular telescope constructed according to the invention. Fig. 2 is a plan view of the binocular telescope according to Fig. 1. Fig. 3 is a front elevation of a second binocular telescope constructed according to the invention. Fig. 4 is a side elevation of the binocular telescope according to Fig. 3.

In the instrument according to Figs. 1 and 2, a stand, tripod or the like is supposed to be provided which has a conical pivot directed upwards. Upon this pivot the member $a$ of the binocular telescope—common to the two hinges and provided with the bearing surface $a^0$—is mounted thus forming the head-piece of the stand. The member $a$ carries in its forked ends the hinge bolts $b$ about which the single telescopes are rotatable by means of the projections $c^0$, which are adapted on the underside of each single telescope. Uniform rotation of both single telescopes is secured by means of the two cog-wheel sectors $c^1$ gearing into one another, which permit of as large a rotation as is necessary to produce the largest and smallest distance between the oculars required. The telescopes $c$ are parallel-vision ones with a large distance between the axis of the ocular $c^2$ and that of the objective $c^3$. Their position extending in a horizontal straight line as represented corresponds to the average distance between the oculars.

The binocular telescope represented in Figs. 3 and 4 also shows enlarged distance between the objectives. A stand head $d$, which may rest with its vertical pivot $d^0$ upon any stand whatever, forms the member common to the two hinges and carries at its two ends the bearings $d^1$ which are open at the top. In these bearings the trunnions $e^0$ of the two single telescopes $e$ are placed. The distance between the axis of the objective $e^1$ Fig. 4, and that of the ocular $e^2$ is so large, that the single telescope has by far its largest dimension in the direction transverse to these axes. The cross-piece $d$ is so long, that two observers can simultaneously and conveniently make use of the single telescopes monocularly, the position of the single telescopes being that shown by the dotted lines in Fig. 3, notwithstanding which, the size of the single telescopes renders it possible to bring the oculars together to a distance equal to the inter-pupillary distance required, as shown by the full lines in Fig. 3. The center of gravity of each single telescope lies, in the arrangement represented, in the common axis of its trunnion.

I claim:

1. The combination, with the head-piece of a stand, of two telescopes and two hinge connections between the telescopes and the head-piece, the hinges lying symmetrical to the head-piece, parallel to each other and to the direction of view of the telescopes and at such points of the telescopes that these can be rotated so as to be symmetrical to the head-piece and suitable for binocular observation.

2. The combination, with the head-piece of a stand, of two parallel-vision telescopes, the main bodies of which lie transverse to the direction of view, and two hinge connections between the telescopes and the head-piece, the hinges being arranged symmetrical to the head-piece, parallel to each other and to the direction of view of the telescopes and each in proximity to the center of gravity of the respective telescope, so that the telescopes can be rotated so as to be either symmetrical to the head-piece and suitable for binocular observation or suitable for simultaneous monocular observation by two observers.

3. The combination, with the head-piece of a stand, of two parallel-vision telescopes, the main bodies of which lie transverse to the direction of view, and two hinge connections between the telescopes and the head-piece, the hinges being arranged symmetrical to the head-piece and parallel to each other and to the direction of view of the telescopes and consisting each of a pair of open bearings provided on the head-piece and a pair of trunnions provided on the respective telescope in proximity to its center of gravity.

RUDOLF STRAUBEL.

Witnesses:
 PAUL KRÜGER,
 RICHARD HAHN.